United States Patent
Kang et al.

(10) Patent No.: US 12,535,861 B2
(45) Date of Patent: Jan. 27, 2026

(54) ELECTRONIC DEVICE INCLUDING IMPACT RESISTANCE-REINFORCING STRUCTURE

(71) Applicant: Samsung Electronics Co., Ltd., Suwon-si (KR)

(72) Inventors: Taehwan Kang, Suwon-si (KR); Sangsik Na, Suwon-si (KR); Jungho Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 18/449,342

(22) Filed: Aug. 14, 2023

(65) Prior Publication Data

US 2024/0019907 A1  Jan. 18, 2024

Related U.S. Application Data

(63) Continuation of application No. PCT/KR2022/095027, filed on Feb. 10, 2022.

(30) Foreign Application Priority Data

Feb. 16, 2021  (KR) .................. 10-2021-0020671

(51) Int. Cl.
*G06F 1/16* (2006.01)
*H05K 5/03* (2006.01)

(52) U.S. Cl.
CPC ............. *G06F 1/1656* (2013.01); *H05K 5/03* (2013.01)

(58) Field of Classification Search
CPC .................................................. G06F 1/1656
See application file for complete search history.

(56) References Cited

U.S. PATENT DOCUMENTS 6,173,898 B1 *  1/2001  Mande ............. G06K 19/07722
                                                  257/679
8,561,831 B2 * 10/2013  Liao ...................... G06F 1/1656
                                                  312/223.4

(Continued)

FOREIGN PATENT DOCUMENTS

CN     206040759 U    3/2017
CN     106657502 A    5/2017

(Continued)

OTHER PUBLICATIONS

International Search Report for PCT/KR2022/095027, mailed Jun. 7, 2023, 5 pages.

(Continued)

*Primary Examiner* — Adrian S Wilson
(74) *Attorney, Agent, or Firm* — Nixon & Vanderhye P.C.

(57) ABSTRACT

An electronic device including at least one impact resistance-reinforcing structure may be disclosed herein. The disclosed electronic device includes: a first plate disposed to face in a first direction; a second plate disposed to face in a second direction opposite to the first direction; and a housing including a side member disposed so as to surround at least a portion of the space between the first and second plates, wherein the housing may include: a first metal material part; a second metal material part spaced apart from the first metal material part; a first reinforcing structure which is formed in the first metal material part and disposed adjacent to an edge portion of the housing; and a non-metal material part which is a structure integrally injection-molded between the first and second metal material parts and connecting the first and second metal material parts, is large enough to cover the first reinforcing structure, and is adhered to the first reinforcing structure. Various other embodiments are possible.

12 Claims, 16 Drawing Sheets

(56) References Cited

U.S. PATENT DOCUMENTS

| | | | |
|---|---|---|---|
| 9,699,926 B2* | 7/2017 | Hwang | H05K 5/0243 |
| 9,722,301 B2 | 8/2017 | Kim et al. | |
| 10,321,590 B2* | 6/2019 | Cater | H01Q 1/24 |
| 10,559,872 B2 | 2/2020 | Hill et al. | |
| 10,705,570 B2 | 7/2020 | Kuna et al. | |
| 2011/0188178 A1* | 8/2011 | Myers | H04M 1/026 |
| | | | 361/679.01 |
| 2012/0175165 A1* | 7/2012 | Merz | G06F 1/1656 |
| | | | 174/50 |
| 2013/0050911 A1* | 2/2013 | Jarvis | G06F 1/1698 |
| | | | 361/679.01 |
| 2016/0050302 A1 | 2/2016 | Lee et al. | |
| 2016/0072932 A1* | 3/2016 | Hill | H04M 1/0249 |
| | | | 455/575.1 |
| 2016/0207236 A1* | 7/2016 | Tsubota | B32B 3/266 |
| 2017/0111077 A1* | 4/2017 | Hwang | H04M 1/0274 |
| 2017/0133748 A1 | 5/2017 | Kim et al. | |
| 2017/0142239 A1 | 5/2017 | Bae et al. | |
| 2018/0070465 A1* | 3/2018 | Cater | B29C 37/0082 |
| 2020/0015378 A1 | 1/2020 | Merz et al. | |
| 2020/0225709 A1 | 7/2020 | Chen et al. | |
| 2020/0266522 A1* | 8/2020 | Moon | H04M 1/026 |
| 2020/0287275 A1 | 9/2020 | Son et al. | |
| 2020/0358890 A1 | 11/2020 | Im et al. | |
| 2021/0037126 A1 | 2/2021 | Yoo et al. | |
| 2021/0303028 A1 | 9/2021 | Cho et al. | |

FOREIGN PATENT DOCUMENTS

| | | |
|---|---|---|
| CN | 107205326 A | 9/2017 |
| CN | 108076192 A | 5/2018 |
| CN | 108174541 A | 6/2018 |
| CN | 110324467 A | 10/2019 |
| CN | 214645316 U | 11/2021 |
| KR | 101568343 B1 | 11/2015 |
| KR | 20160019833 A | 2/2016 |
| KR | 20170053401 A | 5/2017 |
| KR | 20170056198 A | 5/2017 |
| KR | 10-2019-0097553 | 8/2019 |
| KR | 20190097553 A | 8/2019 |
| KR | 20190119924 A | 10/2019 |
| KR | 20200130020 A | 11/2020 |
| WO | 2019074806 A1 | 4/2019 |

OTHER PUBLICATIONS

Written Opinion of the ISA for PCT/KR2022/095027, mailed Jun. 7, 2023, 5 pages.

Extended Search report dated May 14, 2024 issued in European Patent Application No. EP22756614.8.

European Office Action issued Jan. 3, 2025 in corresponding European Patent Application No. 22756614.8.

Korean Office Action dated Apr. 1, 2025 for KR Application No. 10-2021-0020671.

Korean Notice of Patent Grant dated Nov. 21, 2025 issued in Korean Patent Application No. 10-2021-0020671 and English translation, 4 pp.

* cited by examiner

ELECTRONIC DEVICE INCLUDING IMPACT RESISTANCE-REINFORCING STRUCTURE

CROSS-REFERENCE TO RELATED APPLICATIONS

This application is a continuation of International Application No. PCT/KR2022/095027 designating the United States, filed on Feb. 10, 2022, in the Korean Intellectual Property Receiving Office and claiming priority to Korean Patent Application No. filed on Feb. 16, 2021, in the Korean Intellectual Property Office, the disclosures of each of which are incorporated by reference herein in their entireties.

BACKGROUND

Field

Various embodiments of the disclosure relate to a metal case reinforcing structure of an electronic device.

Description of Related Art

A general electronic device may include a housing configured to protect a plurality of electronic parts arranged therein and having the appearance of the electronic device. A housing of an electronic device may be entirely formed of a synthetic resin material, a metal material, or a combination thereof.

When a housing of an electronic device is made of a metal material, the housing may be manufactured via metal NC processing. The metal housing manufactured in this way may have a double junction structure in which a portion of the housing is injection-bonded to improve the performance of at least one antenna disposed therein. For example, a portion of a housing, for example, a side surface member or a bottom surface, may be disposed in a segmented-type structure, that is, a conductive structure and a non-conductive structure disposed between the conductive structures for antenna arrangement.

However, when a portion of a metal housing of an electronic device is formed of a heterogeneous adhesive structure formed of different materials, for example, a metal structure and a non-metal structure, the part of the metal housing may be damaged by an impact such as a fall. For example, when an electronic device such as a smartphone falls, a severe impact may be applied to a corner of a housing thereof.

In addition, when a portion of a metal housing of an electronic device is made of a heterogeneous bonding structure of heterogeneous materials, various problems may occur during a manufacturing process.

For example, as various problems, color loss of a segmented portion of a housing side member or a crack in a segmentation portion during a manufacturing process may occur, or a crack may occur in a segmentation portion during a fall.

These various problems may be a factor which decreases the manufacturing yield of a housing of an electronic device and the rigidity and quality of the electronic device.

SUMMARY

Embodiments of the disclosure provide an electronic device which improves impact resistance of a housing by adding a reinforcing structure to a portion of the housing to widen a bonding area between heterogenous materials and strengthen an adhesive force between the heterogenous materials.

According to various embodiments of the disclosure, an electronic device may include a housing including a first plate disposed to face a first direction, a second plate disposed to face a second direction opposite to the first direction, and a side surface member disposed to surround at least a part of a space between the first and the second plate, wherein the housing includes: a first metallic portion; a second metallic portion spaced apart from the first metallic portion; a first reinforcing structure formed on the first metallic portion and disposed to be adjacent to a corner portion of the housing; and a non-metallic portion, as a structure integrally injection-molded between the first and the second metallic portion and configured to connect the first and the second metallic portion to each other, disposed to be in heterogeneous contact with the metallic portions while having a size large enough to cover the first reinforcing structure.

An electronic device according to various embodiments of the disclosure has improved impact resistance of a metal housing by adding a reinforcing structure at a bonded portion between heterogenous materials of the metal housing.

An electronic device according to various embodiments of the disclosure is able to obtain the effect of expanding the contact area between different materials, strengthening adhesive force, and increasing impact resistance, by adding a reinforcing structure at a bonded portion between heterogenous materials of the metal housing.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
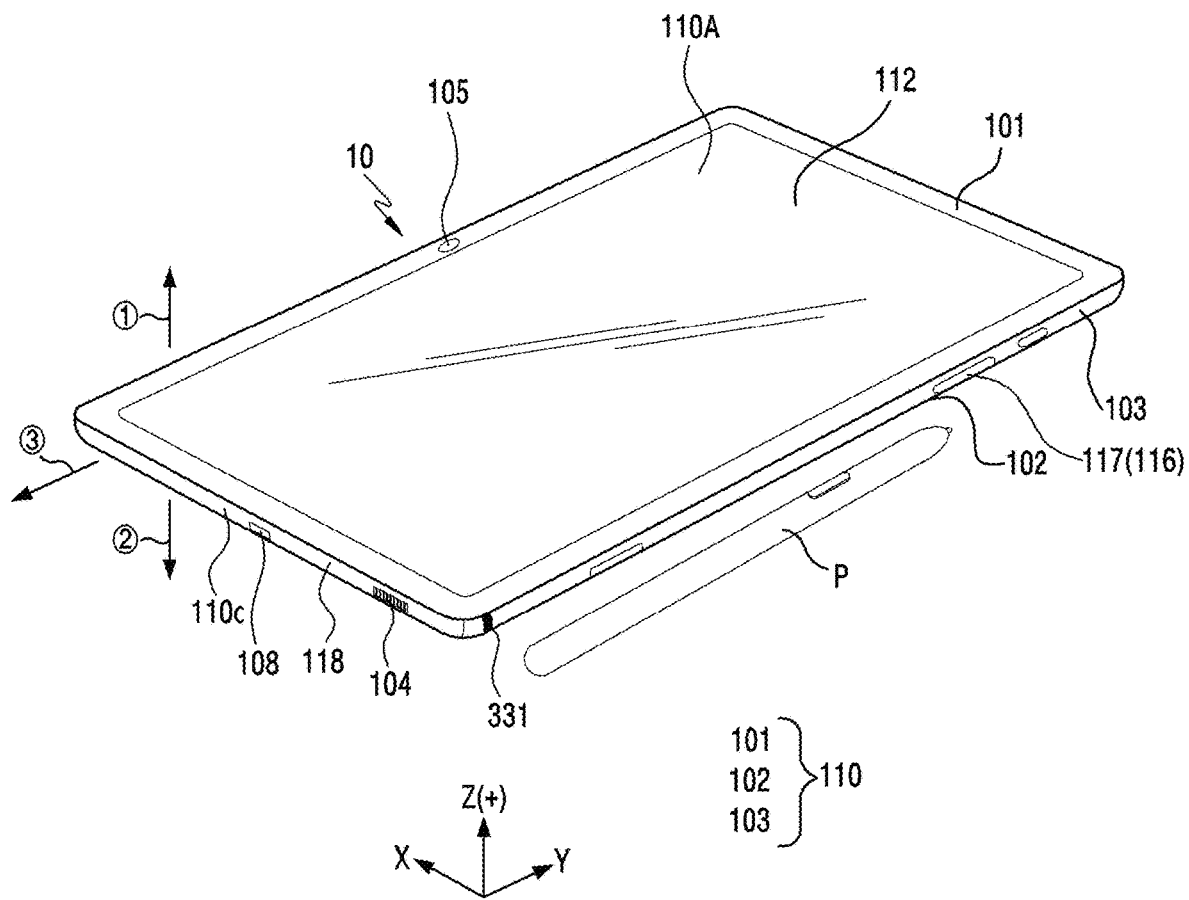
FIG. 1 is a perspective view showing a front surface of an electronic device according to various embodiments of the disclosure.

Hereinafter, various embodiments of the disclosure are described with reference to the attached drawings. However, it should be understood that the embodiments are not intended to limit the scope of the disclosure to the specific embodiments, and the scope includes various modifications, equivalents, and/or alternatives of the embodiments of the disclosure. In relation to the description of drawings, the same or similar reference numerals may be used for the same or similar elements.

Figure 2:
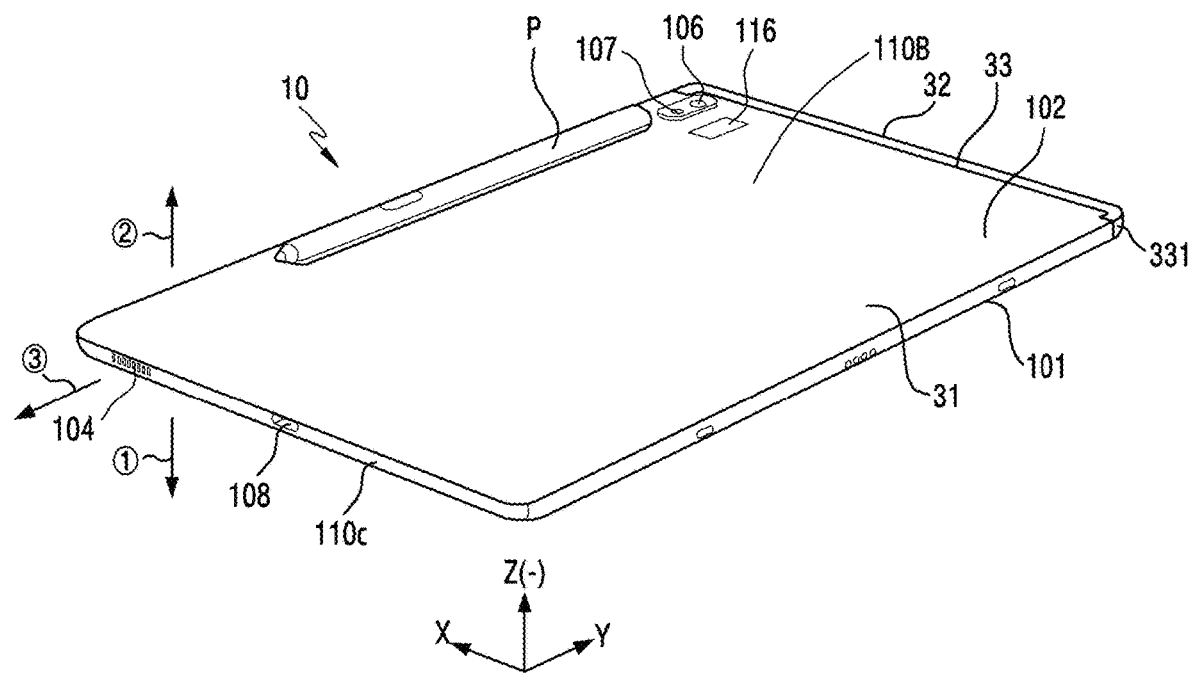
FIG. 2 is a perspective view showing a rear surface of an electronic device according to various embodiments of the disclosure.
Figure 3:
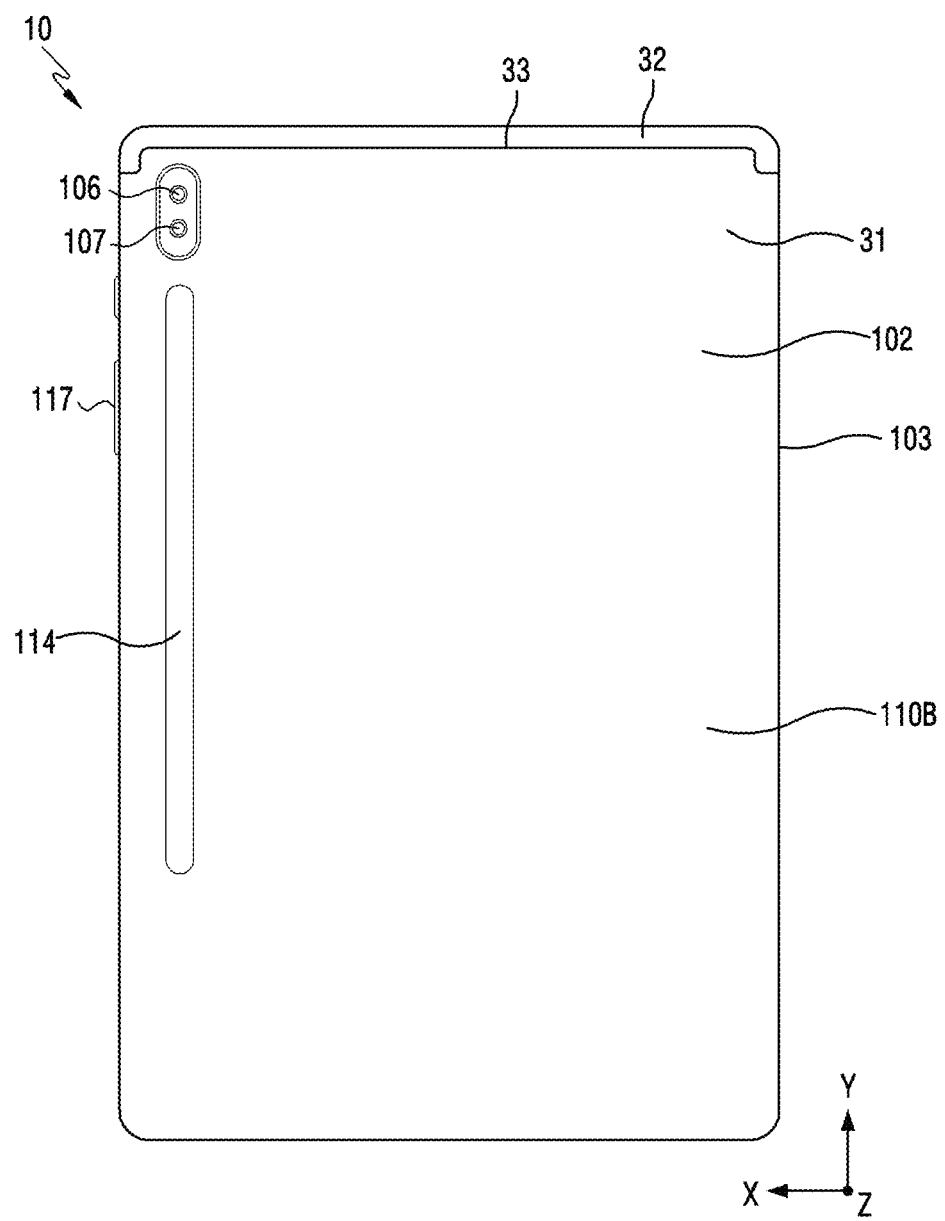
FIG. 3 is a plan view showing a rear surface of an electronic device according to various embodiments of the disclosure.

FIG. 1 is a perspective view showing a front surface of an electronic device according to various embodiments of the disclosure. FIG. 2 is a perspective view showing a rear surface of an electronic device according to various embodiments of the disclosure. FIG. 3 is a plan view showing a rear surface of an electronic device according to various embodiments of the disclosure.

Referring to FIGS. 1 to 3, an electronic device 10 according to an embodiment may include at least one among a smartphone, a tablet personal computer, a mobile phone, a videophone, an e-book reader, a desktop personal computer, a laptop personal computer, a netbook computer, a workstation, a server, a personal digital assistant (PDA), a portable multimedia player (PMP), an MP3 player, a mobile medical device, a camera, or a wearable device (e.g., a smart glasses, a head-mounted-device (HMD), electronic clothing, an electronic bracelet, an electronic necklace, an electronic appcessory, an electronic tattoo, a smart mirror, or a smart watch).

According to an embodiment, an electronic device 10 may include a housing 110 configured to accommodate a plurality of various parts. According to an embodiment, the housing 110 may include a first plate 101, a second plate 102, and a side surface member 103 forming an appearance thereof. According to an embodiment, the housing 110 may include the first plate 101 disposed to face a first direction ①, the second plate 102 disposed to face a second direction ② opposite to the first direction ①, and the side surface member 103 disposed to face a third direction ③ perpendicular to each of the first and the second direction ① and ② and closing a space between the first and the second plate 101 and 102.

The electronic device 10 according to an embodiment may include the housing 110 including a first surface (or a front surface) 110A, a second surface (or a rear surface) 110B, and a side surface (or a side wall) 110C configured to surround a space between the first surface 110A and the second surface 110B. In another embodiment (not shown), the housing may be referred to as a structure forming a portion among the first surface 110A, the second surface 110B, and the side surface 110C of FIG. 1.

According to an embodiment, the first surface 110A may be formed by the first plate 101 at least a part of which is substantially transparent (e.g., a glass plate or a polymer plate including various coating layers). According to an embodiment, the first plate 101 may include a curved surface portion formed on at least one side end portion and bent from the first surface 110A toward the second plate 110B to extend seamlessly.

According to various embodiments, the second surface 110B may be formed by the second plate 102 which is substantially opaque. The second plate 102 may be formed, for example, by coated or tinted glass, ceramic, polymer, metal (e.g., aluminum, stainless steel (STS), or magnesium), or a combination of at least two of the above materials. According to an embodiment, the second plate 102 may include a curved surface portion formed on at least one side end portion and bent from the second surface 110B toward the first plate 101 to extend seamlessly.

According to various embodiments, the side surface 110C may be formed by a side bezel structure (or "a side surface member or a side wall") 118 coupled to the first plate 101 and the second plate 102 and including metal and/or polymer. In an embodiment, the second plate 102 and the side bezel structure 118 may be integrally formed with each other and may include the same material (e.g., a metal material such as aluminum).

According to an embodiment, the electronic device 10 may include at least one among a display 101, an audio module 104, a sensor module, a camera module 105, a key input device 117, and a connector hole 108. In an embodiment, the electronic device 10 may omit at least one (e.g., the key input device 117) of elements, or may additionally include another element. For example, the electronic device 10 may include a sensor module (not shown). For example, a sensor such as a proximity sensor or an illumination sensor may be integrated in the display 112 or disposed at a position adjacent to the display 112 in an area provided by the first plate 101. In an embodiment, the electronic device 10 may further include a light emitting element, and the light emitting element may be disposed at a position adjacent to the display 112 in an area provided by the first plate 101. The light emitting element may provide, for example, the state information of the electronic device 10 in the form of light. In another embodiment, the light emitting element may provide, for example, a light source interlocked with the operation of the camera module 105. The light emitting element may include, for example, an LED, an IR LED, and a xenon lamp.

According to an embodiment, the display 112 may be exposed, for example, via a considerable portion of the first plate 101. In an embodiment, a corner of the display 112 may be formed to be substantially identical to an adjacent outer peripheral shape (e.g., a curved surface) of the first plate 101. In another embodiment (not shown), in order to expand the area in which the display 112 is exposed, the distance between the outer periphery of the display 112 and the outer periphery of the first plate 101 may be formed to be substantially identical. In another embodiment (not shown), a recess or an opening may be formed in a portion of a screen display area of the display 112 to include another electronic part aligned with the recess or the opening, for example, the camera module 105, a proximity sensor (not shown), or an illumination sensor.

In another embodiment (not shown), the display 112 may include at least one among a camera module 107 and a flash 106 in the rear surface of a screen display area thereof. In another embodiment (not shown), the display 112 may be coupled to or disposed to be adjacent to a touch detection circuit, a pressure sensor capable of measuring the intensity (pressure) of a touch, and/or a digitizer for detecting a magnetic stylus pen.

According to an embodiment, the audio module 104 may include a microphone hole and a speaker hole. With respect to the microphone hole, a microphone for obtaining external sound may be disposed therein, and in an embodiment, a plurality of microphones may be arranged to detect a direction of sound. In an embodiment, a speaker hole and a microphone hole may be implemented as a one hole 104, or a speaker may be included without a speaker hole (e.g., a piezo speaker). The speaker hole may include an external speaker hole and a receiver hole for calls.

The electronic device 10 may include a sensor module (not shown), and may thus produce an electrical signal or data value corresponding to an internal operating state or an external environmental state. The sensor module may further include, for example, a proximity sensor disposed on the first surface 110A of the housing 110, a fingerprint sensor integrated to or disposed to be adjacent to the display 112, and/or a biometric sensor (e.g., an HRM sensor) disposed on the second surface 110B of the housing 110. The electronic device 10 may further include a sensor module (not shown), for example, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

According to an embodiment, camera modules 105 and 107 may include a first camera device 105 disposed on the first surface 110A of the electronic device 10 and a second camera device 107 disposed on the second surface 110B, and/or a flash 106. The camera devices 105 and 107 may include one or more lenses, image sensors, and/or image signal processors. The flash 106 may include, for example, a light emitting diode or a xenon lamp. In an embodiment, two or more lenses (an infrared camera and a wide-angle and a telephoto lens) and image sensors may be arranged on one surface of the electronic device.

According to an embodiment, the key input device 117 may be disposed on the side surface 110C of the housing 110. In another embodiment, a part or all of the above-mentioned key input device 117 may not be included in the electronic device 10, and the part of the key input device 117 which is not included in the electronic device may be implemented on the display 112 as another form such as a soft key. In an embodiment, the key input device 117 may include at least a part of a fingerprint sensor 116. For example, the fingerprint sensor 116 may be disposed on a surface exposed to the outside of the key input device 117.

According to an embodiment, the connector hole 108 may receive a connector for transmitting or receiving power and/or data to or from an external electronic device, and/or a connector for transmitting or receiving an audio signal to or from an external electronic device. For example, the connector hole 108 may include a USB connector or an earphone jack.

According to an embodiment, the display 112 may be disposed on a rear surface of the first plate 101. In an example, a partial area of the display 112 may be visually exposed to the outside of the electronic device 10 through a transparent area of the first plate 101. For example, the display 112 may be coupled to, or disposed to be adjacent to, a touch detection circuit, a pressure sensor capable of measuring the intensity (pressure) of a touch, and/or a digitizer which detects a magnetic input pen P. For example, the housing 110 may include a front case, a rear case, or a supporting structure (e.g., a bracket or a seating plate). For example, the first plate 101 may include a window made of a transparent material, and the second plate 102 may include a back cover configuring a rear surface of the electronic device.

According to an embodiment, the second plate 102 may include a reception groove 114 for attaching or detaching an input pen P. As another example, the reception groove 114 may have a shape of a flat surface. The shape of the reception groove 114 is not limited thereto, and may have various shapes for receiving or attaching an input pen P. According to an embodiment, a magnet may be used as a detachable structure of the input pen P. For example, the input pen P may be attached to or detached from the reception groove 114 by using an operating principle of a force acting between a metal and a magnet or a pulling force (e.g., attraction force) between magnets having different polarities. According to an embodiment, the input pen P may produce a signal based on an electric field, by using an electro-magnetic resonance (EMR) method using an electromagnetic resonance-type input signal, or based on an electrically coupled resonance (ECR) method. According to another embodiment, the input pen P may be implemented in an active electrostatic (AES) method, and there is no limit to the type of implementation. In addition, the electronic device 10 may detect the input pen P based on a change in capacitance (self-capacitance or mutual capacitance) associated with at least one electrode of a touch panel.

According to an embodiment, the electronic device 10 may include a segmented structure, for example, a plurality of metallic portions 31 and 32 and a non-metallic portion 33 disposed between each of the plurality of metallic portions 31 and 32 in a portion of the housing 110 to arrange at least one antenna radiator.

A segmented structure for an antenna according to an embodiment may be disposed in the second plate 102 and the side surface member 103 of the housing 110. According to an embodiment, the housing 110 may include a first metallic portion 31, a second metallic portion 32, and a non-metallic portion 33 disposed between the first and the second metallic portion 31 and 32. According to an embodiment, the non-metallic portion 33 may include a first and a second non-metallic portion 331 and 332 arranged on the side surface member 103 of the housing 110 and a third non-metallic portion 333 connecting the first and the second non-metallic portion 331 and 332 and crossing the second plate 102.

Figure 4A:
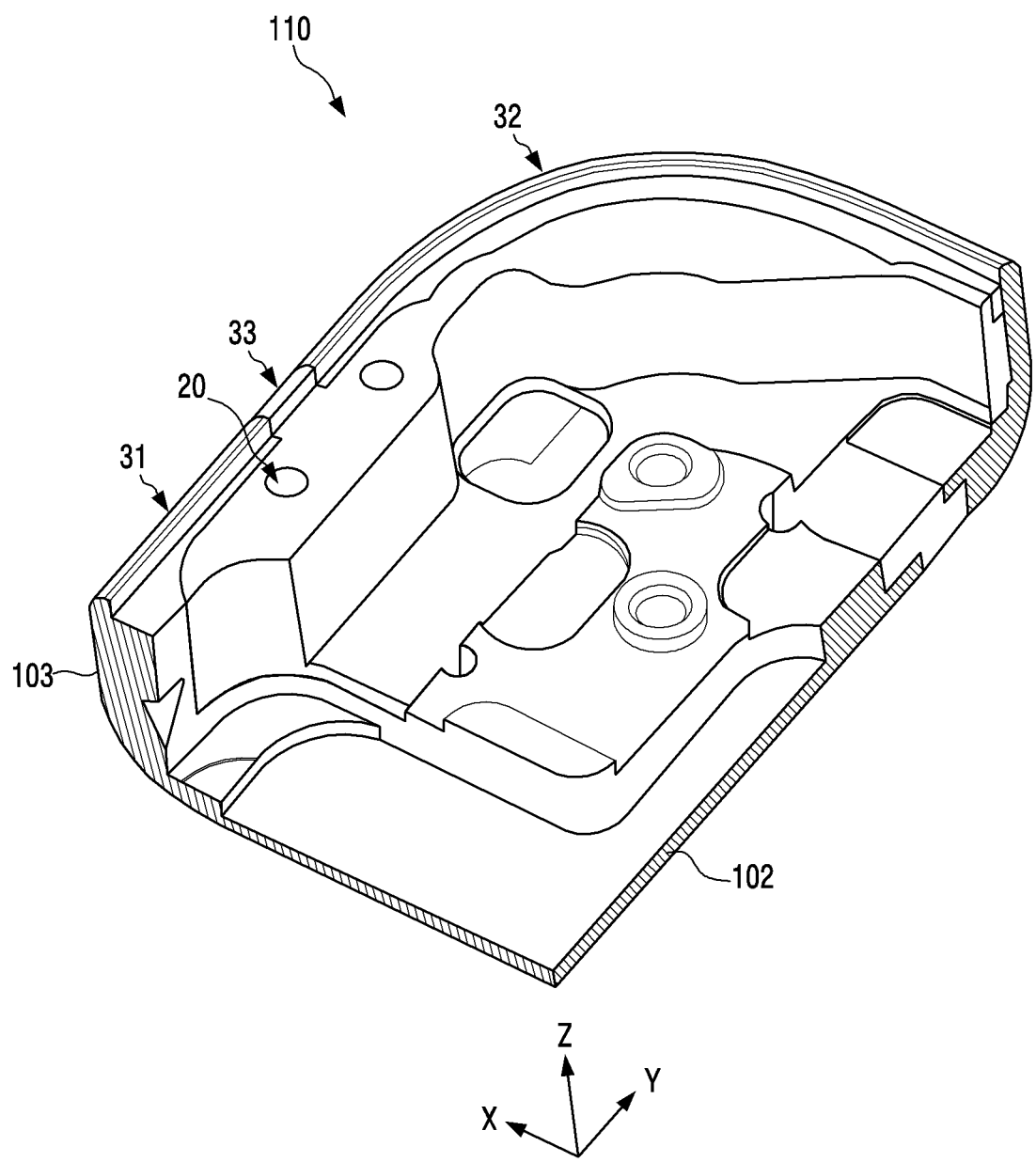
FIGS. 4A and 4B are perspective views each of which shows an outer appearance of reinforcing structures arranged at a corner portion of a housing of an electronic device according to various embodiments of the disclosure.
Figure 4B:
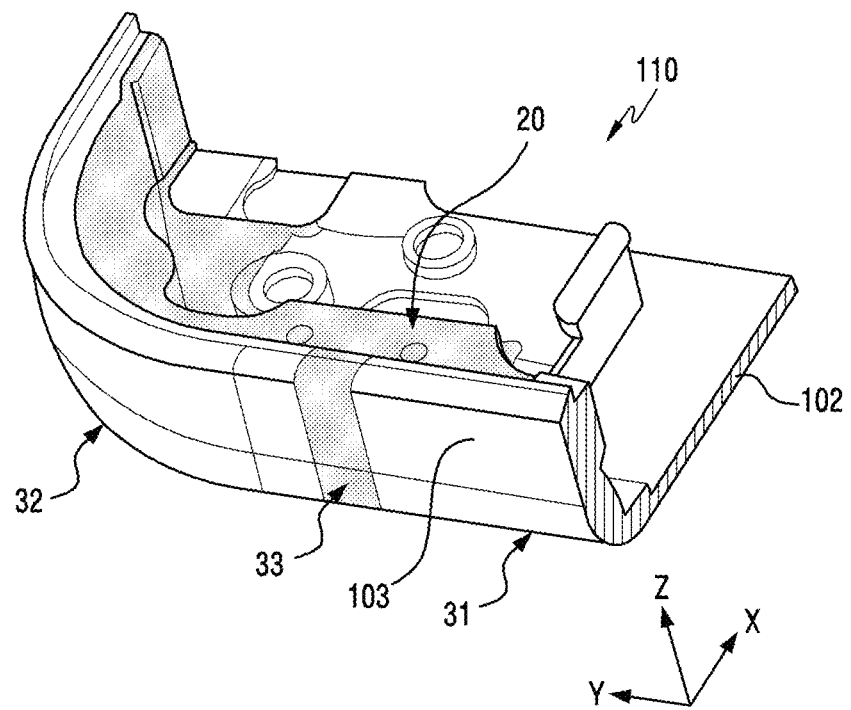
Figure 4C:
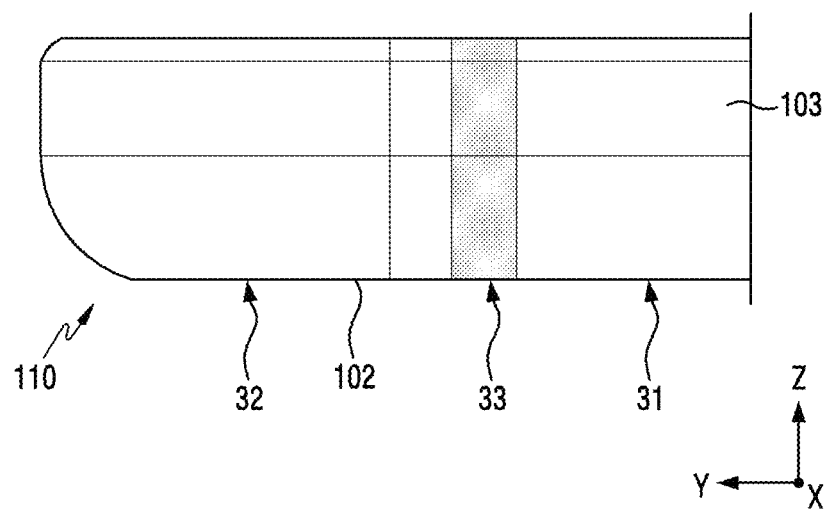
FIG. 4C is a front view showing a corner portion of a housing of an electronic device according to various embodiments of the disclosure.

FIGS. 4A and 4B are perspective views each of which shows an outer appearance of reinforcing structures arranged at a corner portion of a housing of an electronic device according to various embodiments of the disclosure. FIG. 4C is a front view showing a corner portion of a housing of an electronic device according to various embodiments of the disclosure.

Referring to FIGS. 4A to 4C, an electronic device 10 according to an embodiment may include a housing 110 of a metal material. According to an embodiment, the housing 110 may include a first metallic portion 31, a second metallic portion 32, a non-metallic portion 33, and reinforcing structures 20 (reinforcing body).

According to an embodiment, the reinforcing structures 20 may include impact resistant structures as structures for resisting an impact applied to the housing 110 of the electronic device 10. The reinforcing structures 20 according to an embodiment may be rigid structures for enlarging the contact area with the non-metallic portion 33 to increase impact resistance (anti-shocking).

According to an embodiment, the reinforcing structures 20 may be disposed at places adjacent to the non-metallic portion 33 for the arrangement of an antenna disposed in the housing 110 of the electronic device 10, and may be disposed at places adjacent to a corner portion of the housing 110. According to an embodiment, the reinforcing structures 20 may be disposed at a corner portion for the arrangement of an antenna, and may be disposed, for example, at one corner portion, at each of both corner portions symmetrically positioned with each other, or at each of four corner portions of the housing 110.

According to an embodiment, the reinforcing structures 20 may be disposed at the first metallic portion 31, at the second metallic portion 32, or at each of the first and the second metallic portion 31 and 32.

Figure 5:
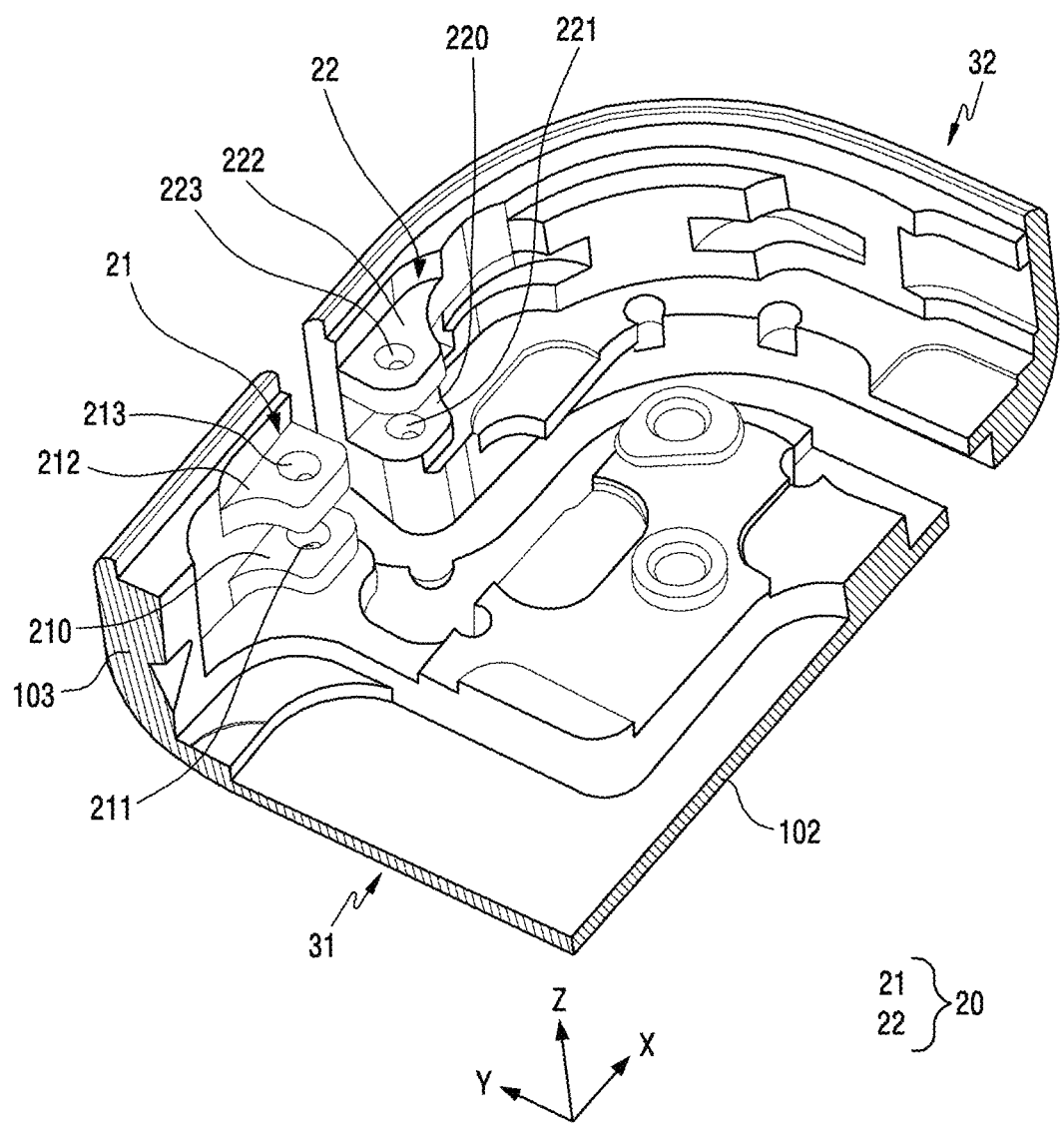
FIG. 5 is a perspective view showing a first and a second reinforcing structure formed on a first and a second metallic portion of a housing before injection molding of heterogeneous materials according to various embodiments of the disclosure.
Figure 6:
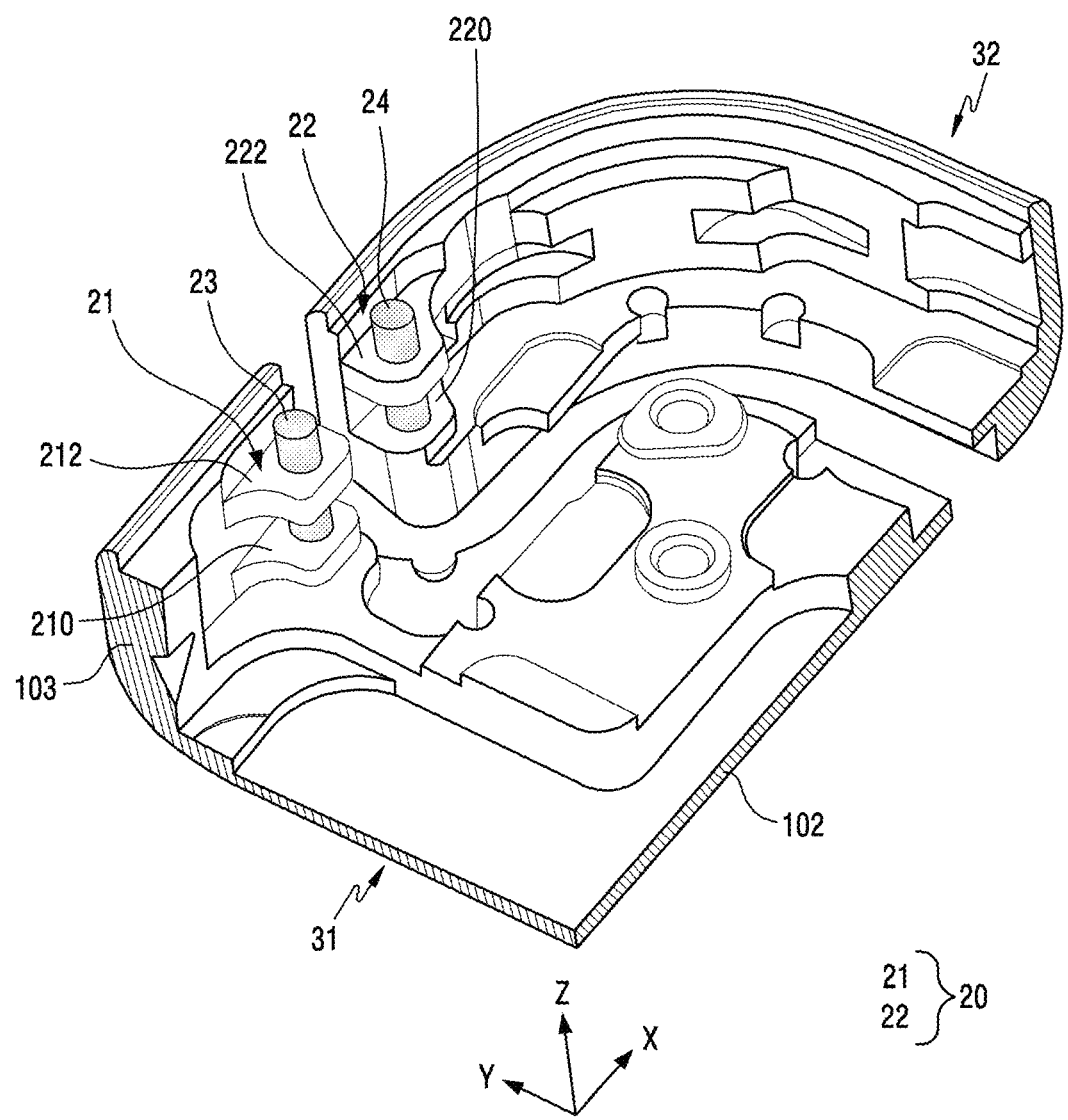
FIG. 6 is a perspective view showing a state in which a first and a second reinforcing pin is press-fitted into a first and a second reinforcing support portion, respectively, according to various embodiments of the disclosure.

FIG. 5 is a perspective view showing a first and a second reinforcing structure formed on a first and a second metallic portion of a housing before injection molding of heterogeneous materials according to various embodiments of the disclosure. FIG. 6 is a perspective view showing a state in which a first and a second reinforcing pin is press-fitted into a first and a second reinforcing support portion, respectively, according to various embodiments of the disclosure.

Referring to FIGS. 5 and 6, according to an embodiment, the reinforcing structures 20 may include a first reinforcing structure 21 disposed on the first metallic portion 31 and a second reinforcing structure 22 disposed on the second metallic portion 32. According to an embodiment, the non-metallic portion 33 may be disposed between the first and the second reinforcing structure 21 and 22. According to an embodiment, the first and the second reinforcing structure 21 and 22 may face each other while being arranged to be symmetric to each other, but are not limited thereto, and may be arranged in an asymmetrical shape with each other. According to an embodiment, the second reinforcing structure 22 may be disposed to be closer to a corner portion of the housing 110 than the first reinforcing structure 21.

According to an embodiment, the first reinforcing structure 21 may include a first and a second reinforcing support portion 210 and 212 (reinforcing support bodies). According to an embodiment, the first reinforcing support portion 210 may have a shape protruding inward from the side surface member 103 of the housing 110, and the second reinforcing support portion 212 may have a shape spaced upward apart from the first reinforcing support portion 210 and protruding inward from the side surface member 103. According to an embodiment, the first and the second reinforcing support portion 210 and 212 may be integrally formed to the housing 110, respectively, as a structure for supporting a reinforcing pin 23 press-fitted therethrough. For example, the first and the second reinforcing support portion 210 and 212 may be formed to be symmetrical to each other, but are not limited thereto. For example, when viewed from above the second plate 102, the first and the second reinforcing support portion 210 and 212 may have a shape of at least partially or entirely overlapping each other.

According to an embodiment, the first reinforcing support portion 210 may include a first through-hole 211 configured to allow the first reinforcing pin 23 to pass therethrough, and the second reinforcing support portion 212 may include a second through-hole 213 configured to allow the second reinforcing pin 24 to pass therethrough. According to an embodiment, the first through-hole 211 may be open upward and downward, and the first through-hole 211 may be open upward and closed downward. According to an embodiment, at least a part of the second reinforcing support portion 212 may have a structure directly connected to the side surface member 103 and the second plate 102.

According to an embodiment, the second reinforcing structure 22 may include a third and a fourth reinforcing support portion 220 and 222. According to an embodiment, the third reinforcing support portion 220 may have a shape protruding from the side surface member 103 of the housing 110 toward the inside of the housing, and the fourth reinforcing support portion 222 may have a shape spaced apart from the third reinforcing support portion 220 along a vertical direction and protruding from the side surface member 103 toward the inside of the housing. According to an embodiment, the third and the fourth reinforcing support portion 220 and 222 may be integrally formed to the housing 110, respectively, as a structure for supporting a second reinforcing pin 24 press-fitted therethrough. For example, the third and the fourth reinforcing support portion 220 and 222 may be formed to be symmetrical to each other, but are not limited thereto. When viewed from above the second plate 102, the third and the fourth reinforcing support portion 220 and 222 may have a shape of partially or entirely overlapping each other.

According to an embodiment, the third reinforcing support portion 220 may include a third through-hole 221 configured to allow the second reinforcing pin 24 to pass therethrough, and the fourth reinforcing support portion 222 may include a fourth through-hole 223 configured to allow the second reinforcing pin 24 to pass therethrough. According to an embodiment, the third through-hole 221 may be open upward and downward, and the fourth through-hole 223 may be open upward and closed downward. According to an embodiment, the third reinforcing support portion 220 may be directly connected to the side surface member 103, and at least a part of the fourth reinforcing support portion 222 may have a structure directly connected to the side surface member 103 and the second plate 102.

According to an embodiment, the first reinforcing pin 23 may be press-fitted into the first reinforcing structure 21. According to an embodiment, the press-fitting direction of the first reinforcing pin 23 may be a vertical direction. For example, the first reinforcing pin 23 has a cylindrical shape, but is not limited thereto, and may be formed in a polygonal columnar shape. According to an embodiment, the first reinforcing pin 23, as a metal material, may be formed of the same material as the first metallic portion 31, but is not limited thereto.

According to an embodiment, when the first reinforcing pin 23 is press-fitted into the first reinforcing structure 21, the upper end portion of the first reinforcing pin 23 may protrude from the second reinforcing support portion 212.

According to an embodiment, the second reinforcing pin 24 may be press-fitted into the second reinforcing structure 22. According to an embodiment, the press-fitting direction of the second reinforcing pin 24 may be a vertical direction. For example, the second reinforcing pin 24 has a cylindrical shape, but is not limited thereto, and may be formed in a polygonal columnar shape. According to an embodiment, the second reinforcing pin 24, as a metal material, may be formed of the same material as the second metallic portion 32, but is not limited thereto.

According to an embodiment, when the second reinforcing pin 24 is press-fitted into the second reinforcing structure 22, the upper end portion of the second reinforcing pin 24 may protrude from the fourth reinforcing support portion 222.

Figure 7:
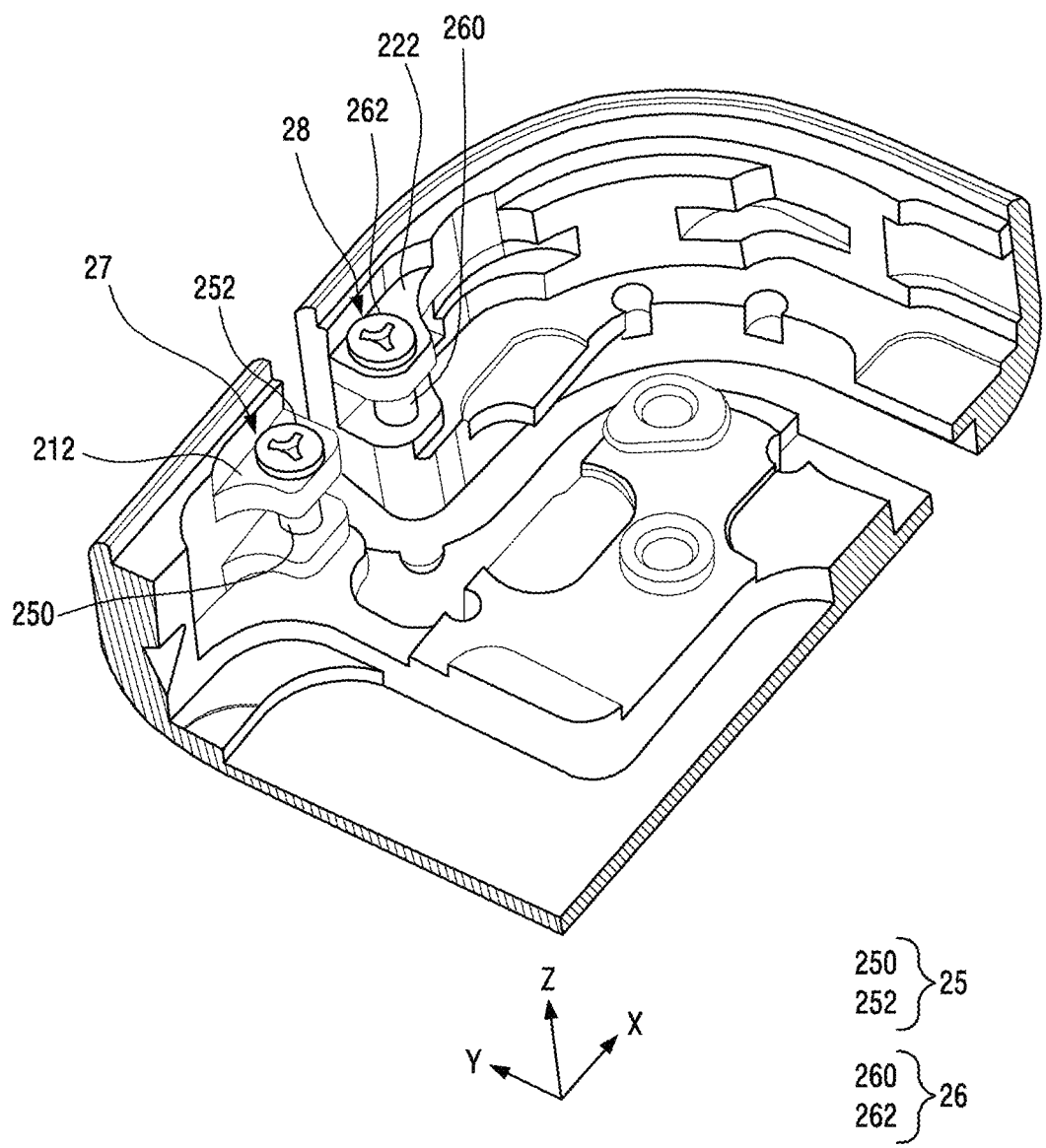
FIG. 7 is a perspective view showing a state in which a third and a fourth reinforcing pin is press-fitted into a first and a second reinforcing support portion, respectively, according to various embodiments of the disclosure.

FIG. 7 is a perspective view showing a state in which a third and a fourth reinforcing pin is press-fitted into a first and a second reinforcing support portion, respectively, according to various embodiments of the disclosure.

Referring to FIG. 7, when compared to the first and the second reinforcing structure 21 and 22 shown in FIG. 6, a first and a second reinforcing structure 27 and 28 according to an embodiment is different only in the structures of a third and a fourth reinforcing pin 25 and 26 and are identical in the other structures, and thus the description of the other elements will be omitted to avoid redundant description. The third and the fourth reinforcing pin 25 and 26 have the same shape, but are not limited thereto, and may have shapes different from each other.

According to an embodiment, the third reinforcing pin 25 may include a first body portion 250 and a first head portion 252 integrated with the first body portion 250. For example, the third reinforcing pin 25, as a screw shape, may be fastened and fixed to a first and a second through-hole (e.g., the first and the second through-hole 211 and 213 shown in FIG. 5). According to an embodiment, when the first reinforcing pin 25 is press-fitted into the first and the second through-hole 211 and 213, the first body portion 250 may be press-fitted into the first and the second through-hole 211 and 213 and the first head portion 252 may be located on the second reinforcing support portion 212.

According to an embodiment, the fourth reinforcing pin 26 may include a second body portion 260 and a second head portion 262 integrated with the second body portion 260. For example, the fourth reinforcing pin 26, as a screw shape, may be fastened and fixed to a third and a fourth through-hole (e.g., the third and the fourth through-hole 221 and 223 shown in FIG. 5). According to an embodiment, when the fourth reinforcing pin 26 is press-fitted into the third and the fourth through-hole 221 and 223, the second body portion 262 may be press-fitted into the third and the fourth through-hole 221 and 223, and the second head portion 260 may be located on the fourth reinforcing support portion 222.

The third and the fourth reinforcing pin 25 and 26 shown in FIG. 7 may have a larger contact area with the non-metallic portion 33, when compared to the first and the second reinforcing pin 23 and 24 shown in FIG. 6.

Figure 8:
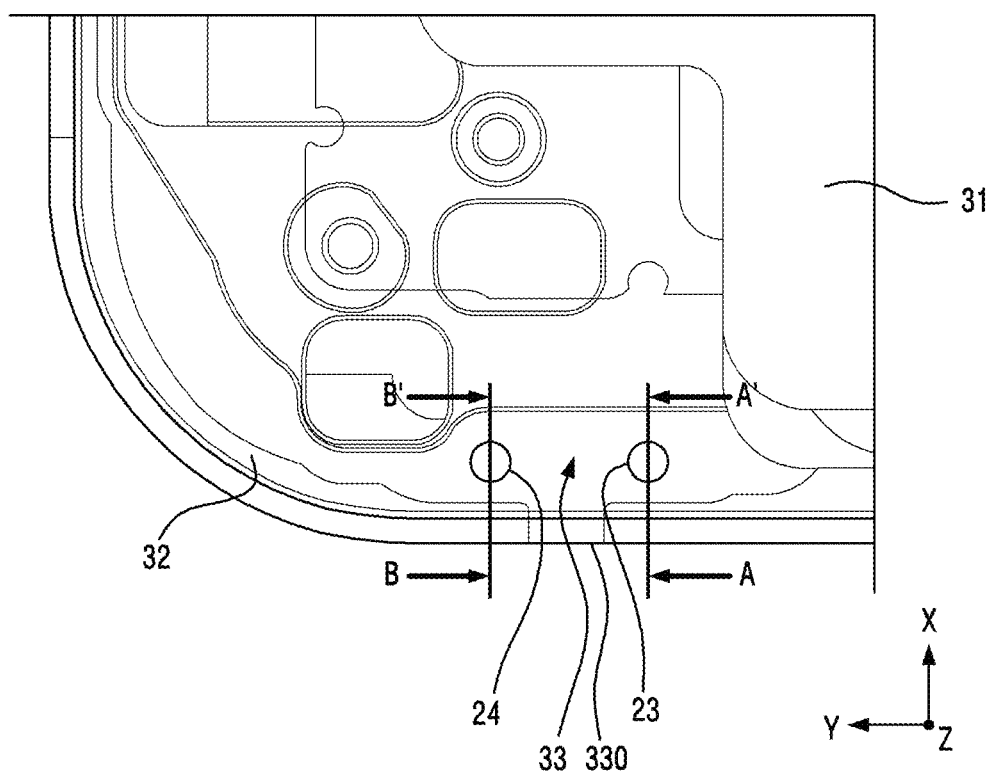
FIG. 8 is a plan view showing reinforcing structures formed on a first and a second metallic portion of a housing before injection molding of heterogeneous materials according to various embodiments of the disclosure.
Figure 9:
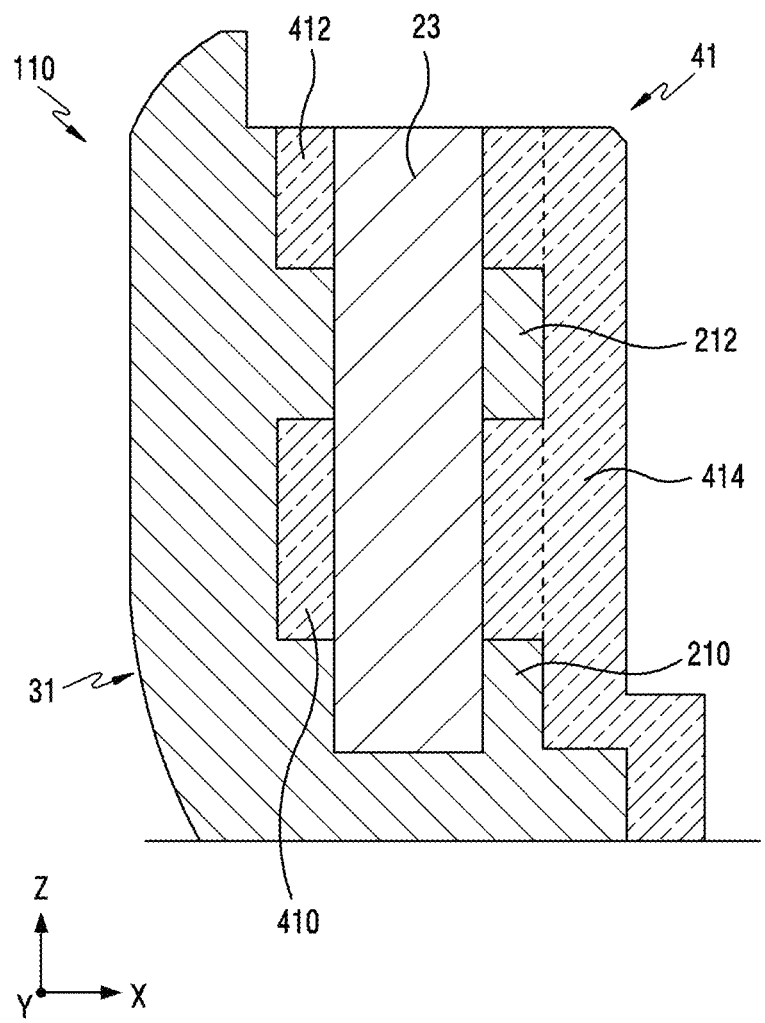
FIG. 9 is a cross-sectional view of the reinforcing structures, taken along the line A-A' of FIG. 8.
Figure 10:
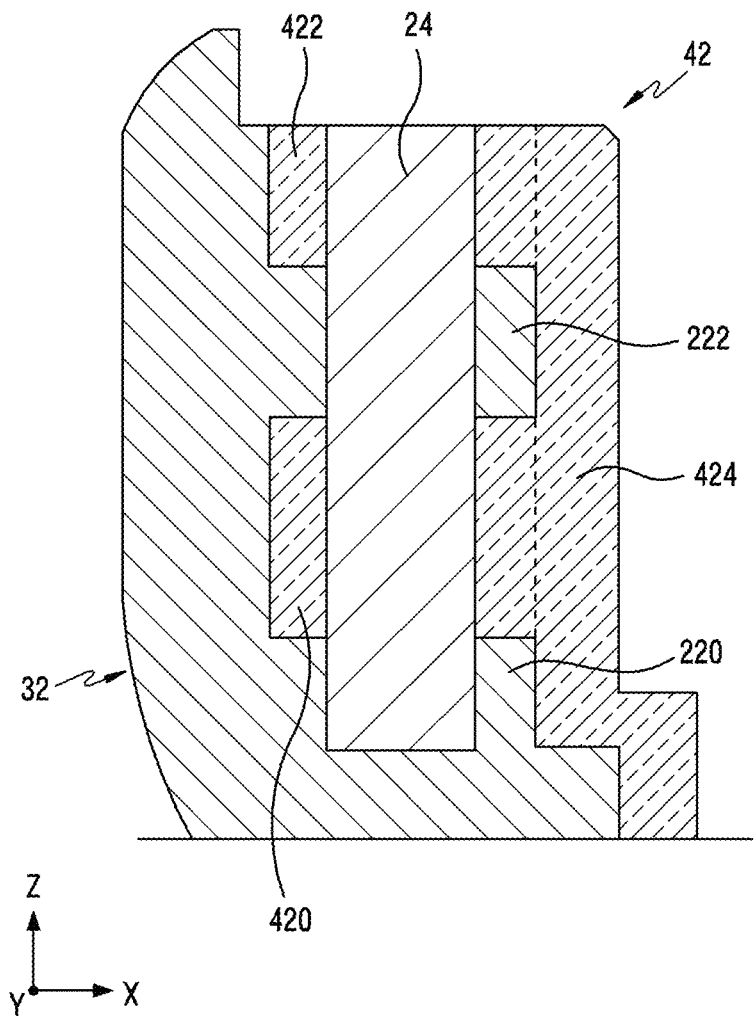
FIG. 10 is a cross-sectional view of the reinforcing structures, taken along the line B-B' of FIG. 8.

FIG. 8 is a plan view showing reinforcing structures formed on a first and a second metallic portion of a housing before heterogenous injection molding according to various embodiments of the disclosure. FIG. 9 is a cross-sectional view of the reinforcing structures, taken along the line A-A' of FIG. 8. FIG. 10 is a cross-sectional view of the reinforcing structures, taken along the line B-B' of FIG. 8.

Referring to FIGS. 8 to 10, reinforcing structures arranged in a housing 110 according to an embodiment may include a non-metallic portion 33 injection-bonded between a first and a second metallic portion 31 and 32. For example, the non-metallic portion 33 may be formed of a non-conductive material, as an insulating material.

The non-metallic portion 33 according to an embodiment may be injection-molded to a first and a second reinforcing structure (e.g., the first and the second reinforcing structure 21 and 22 shown in FIG. 5) and may thus include a third and a fourth reinforcing structure 41 and 42 arranged to be in contact with the first and the second reinforcing structure, respectively. According to an embodiment, after being injection-molded between the first and the second metallic portion 31 and 32, the third and the fourth reinforcing structure 41 and 42 may be in contact with the first and the second reinforcing structure 21 and 22, thereby being formed as reinforcing structures, respectively.

According to an embodiment, the third reinforcing structure 41 may include a fifth and a sixth reinforcing support portions 410 and 412 and a first connection portion 414 for connecting the fifth and the sixth reinforcing support portions 410 and 412. According to an embodiment, the fifth reinforcing support portion 410 may have a shape disposed between a first and a second reinforcing support portion 210 and 212, and the sixth reinforcing support portion 412 may have a shape spaced upward apart from the fifth reinforcing support portion and disposed on the second reinforcing support portion 212. According to an embodiment, the fifth and the sixth reinforcing support portion 410 and 412 may be a structure for supporting the reinforcing pin 23 press-fitted therein. For example, the fifth and the sixth reinforcing support portion 410 and 412 may be formed asymmetrically, but are not limited thereto. According to an embodiment, when viewed from above the second plate 102, the fifth and the sixth reinforcing support portion 410 and 412 may be arranged to overlap each other at least partially or entirely.

According to an embodiment, the fourth reinforcing structure 42 may include a seventh and an eighth reinforcing support portion 420 and 422 and a second connection portion 424 for connecting the seventh and the eighth reinforcing support portion 420 and 422 to each other. According to an embodiment, the seventh reinforcing support portion 410 may have a shape disposed between the third and the fourth reinforcing support portion 220 and 222, and the eighth reinforcing support portion 412 may have a shape spaced upward apart from the seventh reinforcing support portion 410 and disposed on the fourth reinforcing support portion 222. According to an embodiment, the seventh and the eighth reinforcing support portion 410 and 412 may be a structure for supporting the second reinforcing pin 24 press-fitted therein. For example, the seventh and the eighth reinforcing support portion 410 and 412 may be formed to be asymmetric to each other, but are not limited thereto. According to an embodiment, when viewed from above the second plate 102, the seventh and the eighth reinforcing support portion 410 and 412 may be arranged to overlap each other at least partially or entirely.

According to an embodiment, with respect to the reinforcing structures, the outer surface of the first reinforcing structure 21 and the outer surface of the third reinforcing structure 41 may be arranged in a structure to be in contact with each other, the outer surface of the second reinforcing structure 22 and the outer surface of the fourth reinforcing structure 42 may be arranged to be in contact with each other, and thus the area in contact with each other may be enlarged, thereby improving the performance of the reinforcing structure against impact to the housing.

Figure 11A:
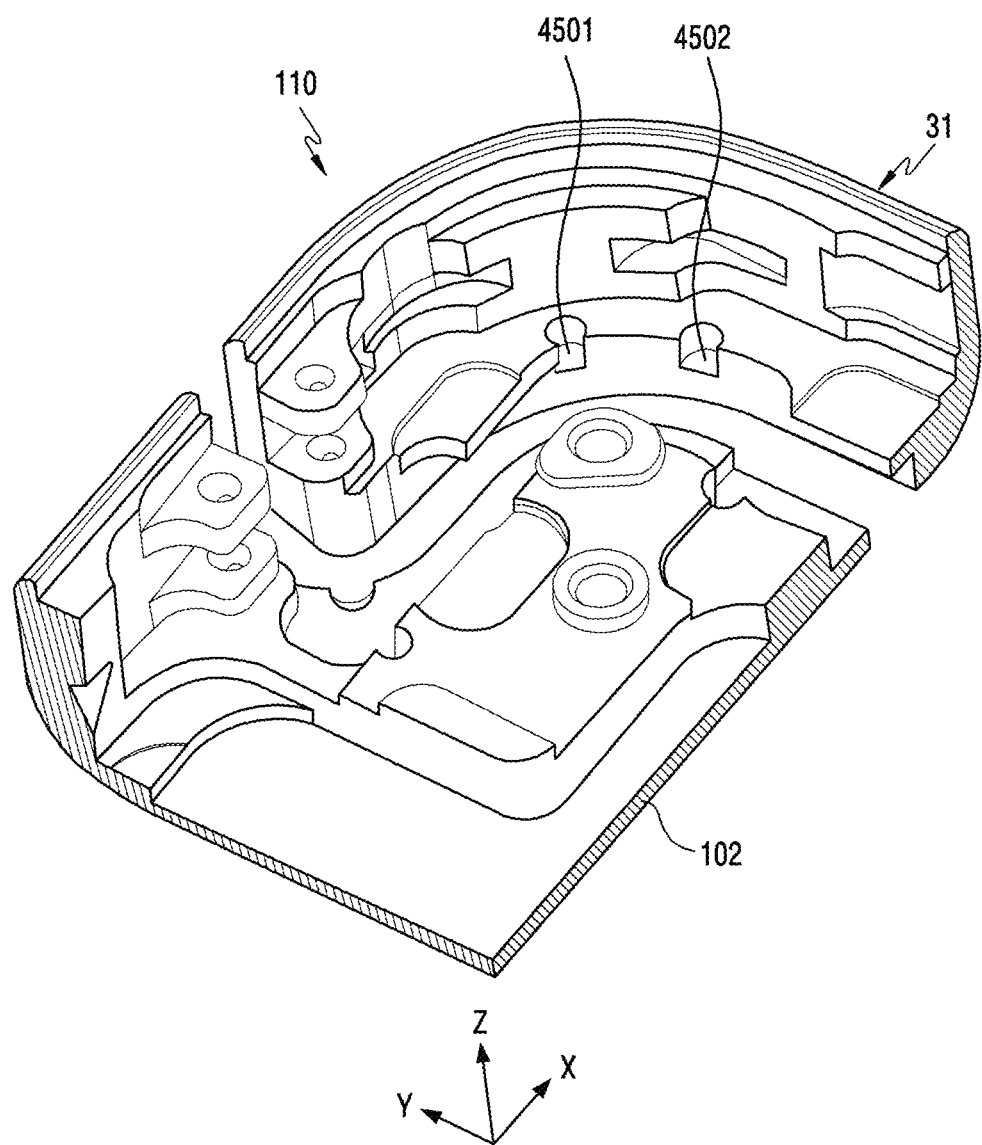
FIG. 11A is a perspective view showing through-holes of a reinforcing structure disposed in a corner area of a housing according to various embodiments of the disclosure.
Figure 11B:
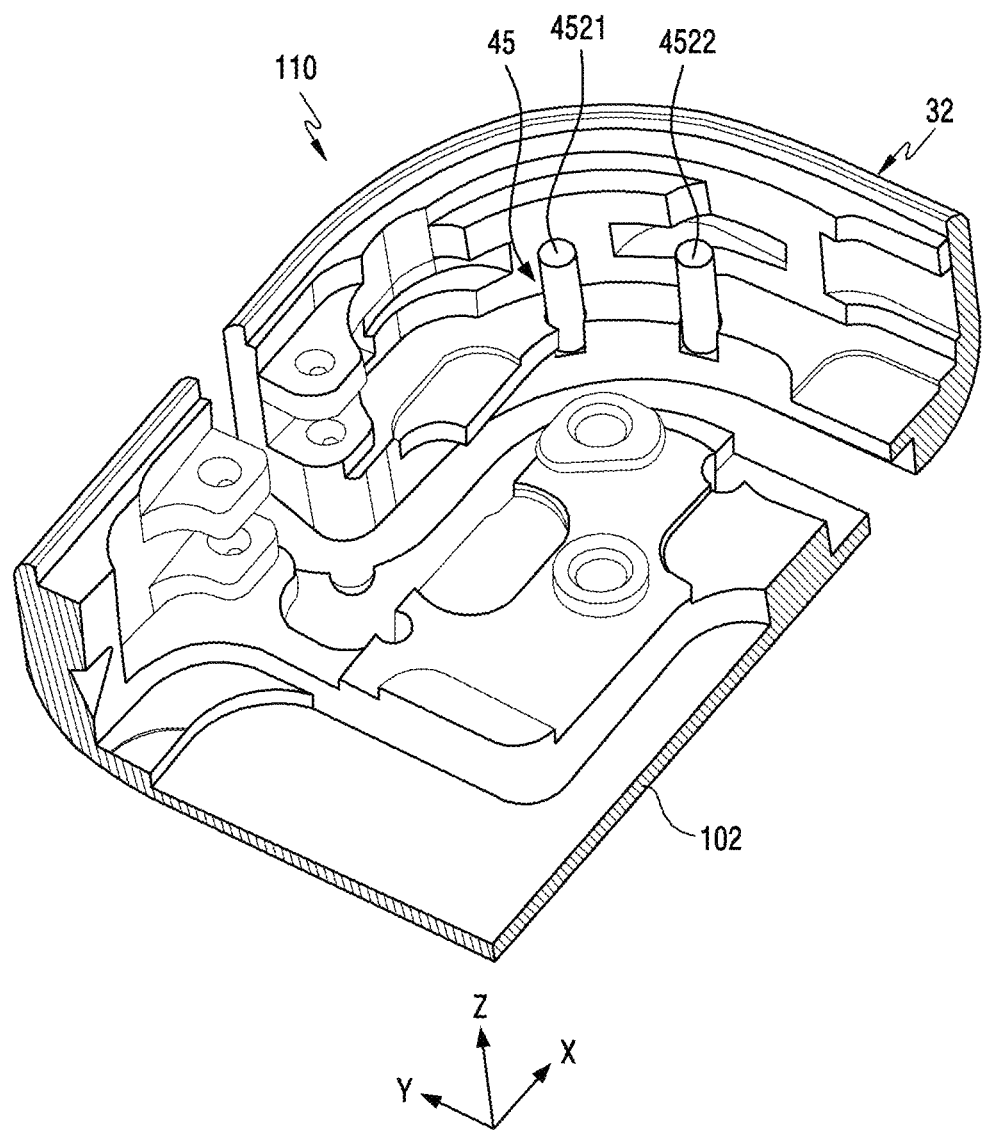
FIG. 11B is a perspective view showing a state in which reinforcing pins are press-fitted into the through-holes formed in FIG. 11A, respectively.

FIG. 11A is a perspective view showing through-holes of a reinforcing structure disposed in a corner area of a housing according to various embodiments of the disclosure. FIG. 11B is a perspective view showing a state in which reinforcing pins are press-fitted into the through-holes formed in FIG. 11A, respectively.

Referring to FIGS. 11A and 11B, with respect to the reinforcing structures according to an embodiment, a fifth reinforcing structure 45 may be additionally disposed at a corner area in the second metallic portion 31 of the housing 100.

The fifth reinforcing structure 45 according to an embodiment may include at least one fifth through-hole 4501 and 4502 and fifth reinforcing pins 4521 and 4522. According to an embodiment, after being injection-molded, the fifth reinforcing structure 45 may be in contact with the non-metallic portion, and thus the contact area may be enlarged, thereby improving the reinforcement strength of the corner portion of the housing 110.

According to an embodiment, the fifth through-holes 4501 and 4502 may have a cylindrical shape which is opened in the Z-axis direction, that is, a first direction (e.g., the first direction ① shown in FIG. 1) on the second plate 102, and may have a shape having a closed lower end and an open upper end. According to an embodiment, the fifth reinforcing pins 4521 and 4522 may be press-fitted into the fifth through-holes 4501 and 4502, respectively. For example, two fifth through-holes 4501 and 4502 may be formed at locations spaced apart from each other.

According to an embodiment, the fifth reinforcing pins 4521 and 4522 may be press-fitted into the fifth through-holes 4501 and 4502, and then injection-molded, and may thus be arranged and connected to the non-metallic portion. For example, the fifth reinforcing pins 4521 and 4522, as a metal material, may be formed of the same material as the second metallic portion 32, or may be formed of a different material.

According to an embodiment, the fifth reinforcing pins 4521 and 4522 may not need to be limited to a cylindrical shape, and may be replaced with the screw-type reinforcing pins 27 and 28 shown in FIG. 7.

Figure 12A:
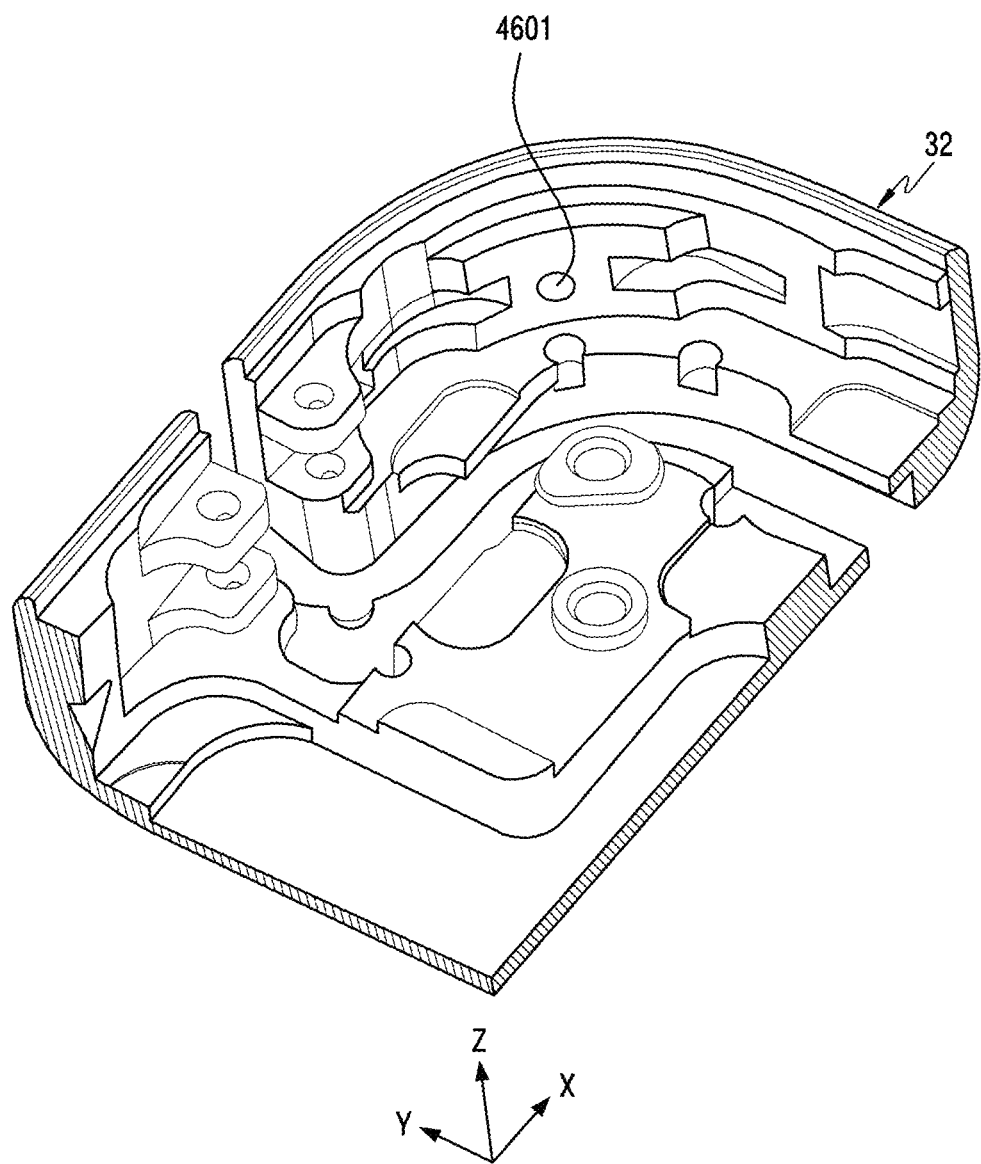
FIG. 12A is a perspective view showing a through-hole formed through a reinforcing structure on a side surface member in a corner area of a housing according to various embodiments of the disclosure.
Figure 12B:
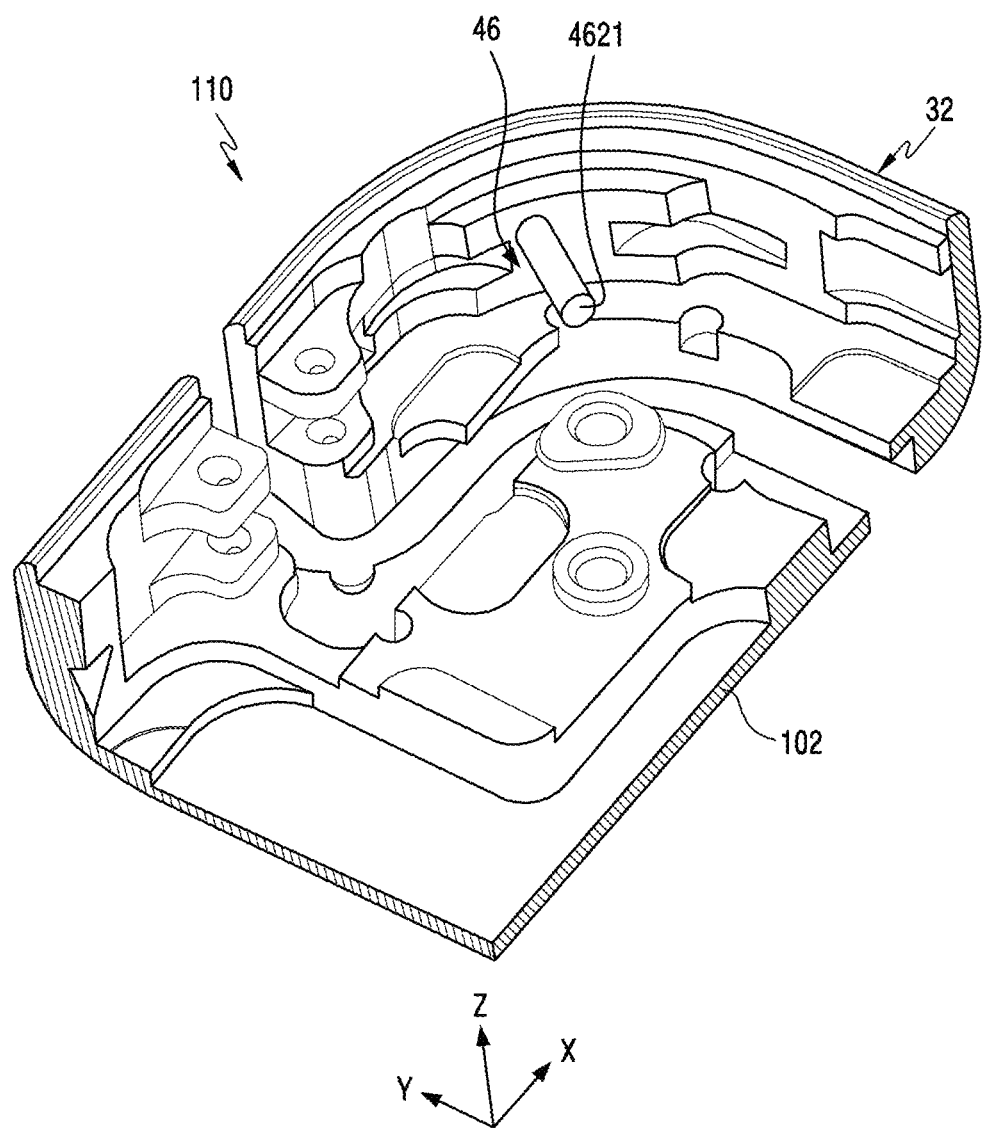
FIG. 12B is a perspective view showing a state in which a reinforcing pin is press-fitted into the through-hole formed in FIG. 12A.

FIG. 12A is a perspective view showing a through-hole formed through a reinforcing structure on a side surface member in a corner area of a housing according to various embodiments of the disclosure. FIG. 12B is a perspective view showing a state in which a reinforcing pin is press-fitted into the through-hole formed in FIG. 12A.

Referring to FIGS. 12A and 12B, a reinforcing structure according to an embodiment may additionally dispose a sixth reinforcing structure 46 in a corner area in the second metallic portion 31 of the housing 100.

The sixth reinforcing structure 46 according to an embodiment may include a sixth through-hole 4601 and a sixth reinforcing pin 4621. According to an embodiment, after being injection-molded, the sixth reinforcing structure 46 may be in contact with the non-metallic portion, and thus the contact area may be enlarged, thereby improving the reinforcing strength of the corner portion of the housing 110.

According to an embodiment, the sixth through-hole 4601 may have a cylindrical shape which is opened in the direction of the center of curvature of the corner portion on the side surface member 103 of the second metallic portion 32, and may have a closed one end and the other open end. According to an embodiment, the sixth through-hole 4601 may be a hole into which the sixth reinforcing pin 4621 is to be press-fitted. For example, the sixth through-hole 4601 may not need to limited to be a single hole formed in a corner area of the housing, and may be formed as two or more holes.

According to an embodiment, after being press-fitted into the sixth through-hole 4601, the sixth reinforcing pin 4621 may be injection-molded with a non-metallic material, thereby being arranged to be in contact with the non-metallic portion (e.g., the non-metallic portion 33 shown in FIG. 8). For example, the fourth reinforcing pin 4621, as a metal material, may be formed of the same material as the second metallic portion 32, or of a different material.

According to an embodiment, the sixth reinforcing pin 4621 may not need to be limited to have a cylindrical shape, and may be replaced with the screw-type reinforcing pins 27 and 28 shown in FIG. 7.

The various embodiments of the disclosure disclosed in the specification and drawings are only presented as specific examples to easily explain the technical content of the disclosure and help understanding of the disclosure, and are not intended to limit the scope of the disclosure. Therefore, the scope of the disclosure should be construed to include all changes or modifications derived based on the technical idea of the disclosure, in addition to the embodiments disclosed herein.

What is claimed is:

1. An electronic device comprising:
a housing comprising a first plate disposed to face a first side, a second plate disposed to face a second side opposite to the first side, and a side member disposed to surround at least a part of a space between the first plate and the second plate,
wherein the side member comprises:
a corner portion configured to operate an antenna radiator;
a first metallic portion spaced apart from the corner portion and configured to operate an antenna radiator;
a first reinforcing structure including a first through hole and disposed at the corner portion, the first reinforcing structure comprising a first reinforcing pin configured to be inserted into the first through hole, and
a non-metallic portion integrally injection-molded between the first metallic portion and the corner portion and the non-metallic portion comprising a first portion between the first metallic portion and the corner portion, and a second portion extending from the first portion and covering the first reinforcing structure, and
wherein the second portion comprises a second through hole in which the first reinforcing pin is inserted.

2. The electronic device of claim 1, wherein the side member further comprises a second reinforcing structure comprising:
a first reinforcing support portion comprising a third through-hole and being in contact with the non-metallic portion;
a second reinforcing support portion spaced apart from the first reinforcing support portion, comprising a fourth through-hole, and being in contact with the non-metallic portion; and
a second reinforcing pin configured to be press-fitted into the third and the fourth through-hole and be in contact with the non-metallic portion.

3. The electronic device of claim 2, wherein each of the first and the second reinforcing support portion protrudes from the side member toward the space.

4. The electronic device of claim 2, wherein, in a view from above the second plate, only the upper end of the second reinforcing pin is viewed and the rest of the second reinforcing structure is disposed to be covered by the non-metallic portion.

5. The electronic device of claim 2, wherein the third metallic portion further comprises a third reinforcing structure facing the second reinforcing structure, and wherein the non-metallic portion is formed to have an area large enough to cover the third reinforcing structure.

6. The electronic device of claim 5, wherein the third reinforcing structure comprises:
a third reinforcing support portion comprising a fifth through-hole and being in contact with the non-metallic portion;
a fourth reinforcing support portion spaced apart from the third reinforcing support portion, comprising a sixth through-hole, and being in contact with the non-metallic portion; and
a third reinforcing pin configured to be press-fitted into the fifth and the sixth through-hole and be in contact with the non-metallic portion.

7. The electronic device of claim 6, wherein each of the first reinforcing pin or the second reinforcing pin or the third reinforcing pin has any one of a cylindrical shape or a screw shape.

8. The electronic device of claim 6, wherein each of the third and the fourth support portion protrudes from a side surface member of the first metallic portion toward the inside of the housing, and
wherein, in a view from above the second plate, the third and the fourth reinforcing support portion are formed to at least partially overlap each other.

9. The electronic device of claim 6, wherein, in a view from above the second plate, only the upper end of the second reinforcing pin is viewed and the rest of the second reinforcing structure is disposed to be covered by the non-metallic portion.

10. The electronic device of claim 6, wherein the second reinforcing structure further comprises:
a fifth reinforcing support portion formed on the non-metallic portion, disposed to be in contact with the first reinforcing pin, and disposed between the first and the second reinforcing support portion; and
a sixth reinforcing support portion disposed to be in contact with the first reinforcing pin, spaced apart from the fifth reinforcing support portion, and disposed on the second reinforcing support portion.

11. The electronic device of claim 10, wherein the third reinforcing structure further comprises:
a seventh reinforcing support portion formed on the non-metallic portion, disposed to be in contact with the third reinforcing pin, and disposed between the third and the fourth reinforcing support portion; and
an eighth reinforcing support portion disposed to be in contact with the third reinforcing pin, spaced apart from the seventh reinforcing support portion, and disposed on the fourth reinforcing support portion.

12. The electronic device of claim 5, wherein the second metallic portion further comprises a seventh reinforcing structure at a corner portion of the housing, and
wherein the sixth reinforcing structure further comprises:
a fifth through-hole formed through the first plate; and
a third reinforcing pin configured to be press-fitted into the fifth through-hole.

* * * * *